Sept. 19, 1944.  C. N. BEBINGER  2,358,310
BEARING
Filed Jan. 29, 1944

INVENTOR.
Charles N. Bebinger
BY
Hoodling and Krost.
attys

Patented Sept. 19, 1944

2,358,310

UNITED STATES PATENT OFFICE 2,358,310

BEARING

Charles N. Bebinger, New Philadelphia, Ohio, assignor to La-Del Conveyor & Manufacturing Company, a corporation of Ohio Application January 29, 1944, Serial No. 520,179

6 Claims. (Cl. 308—187.1)

The invention relates in general to a bearing and more particularly to a bearing which may be mounted upon revoluble parts such, for example, as upon a variable pitch fan.

An object of the invention is the provision of preventing lubricant from escaping from the bearing under the action of centrifugal force.

Another object of the invention is the provision of a shell for enclosing the bearing to keep the lubricant from escaping from the bearing under the action of centrifugal force.

Another object of the invention is the provision of sealing the bearing element between the races so that lubricant cannot escape therefrom under the action of centrifugal force.

Another object of the invention is the provision of using a standard bearing in combination with the present invention.

Other objects and a fuller understanding of the invention may be had by referring to the following description and claims, taken in conjunction with the accompanying drawing, in which:

Figures 1, 2, 3, 4, 5:
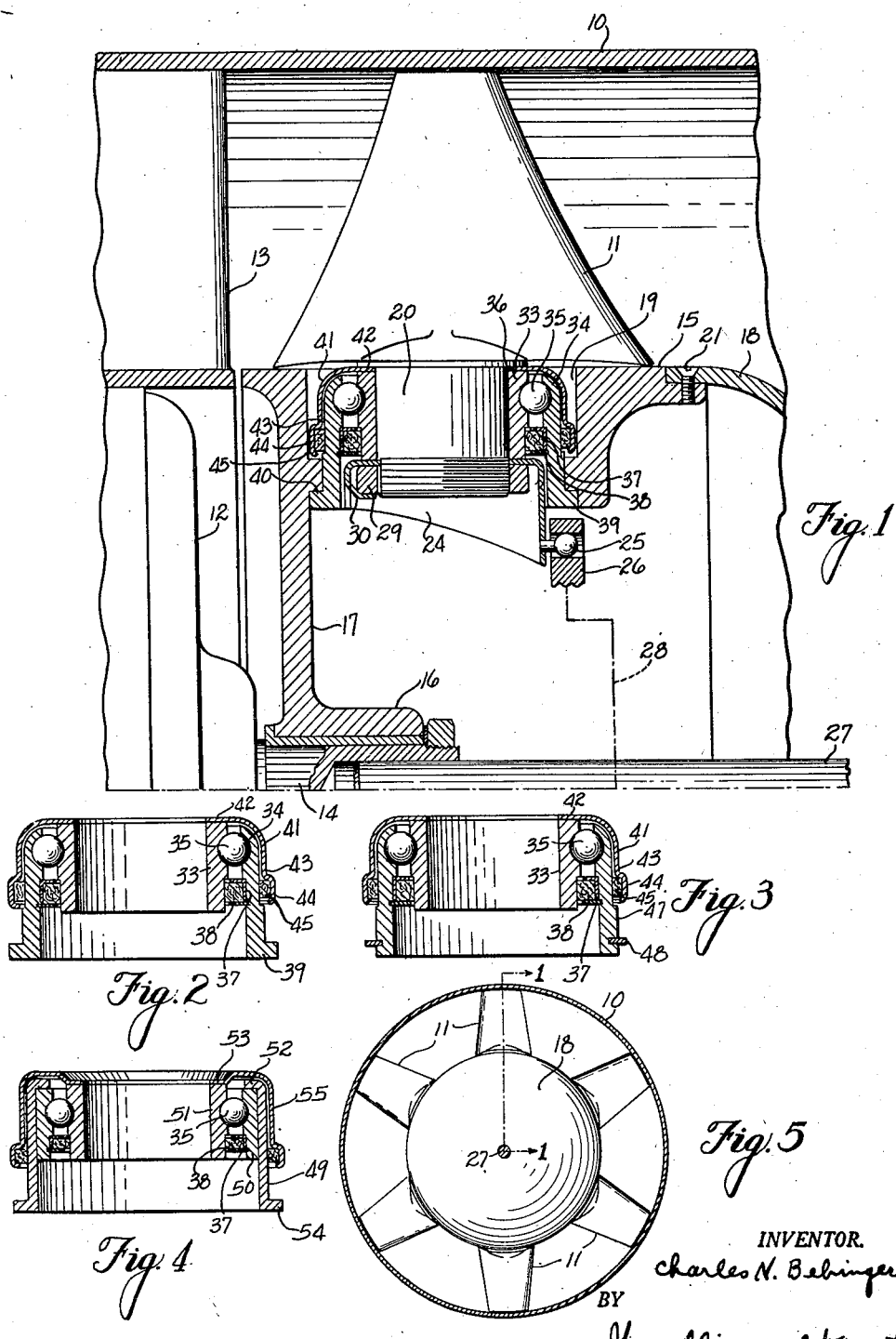
Figure 1 is an enlarged cross-sectional view taken along the line 1—1 of Figure 5, and showing particularly the construction of the bearing.
Figure 2 is a view of the bearing as shown in Figure 1.
Figure 3 is a modification of the bearing shown in Figure 2.
Figure 4 is a further modification of the bearing and utilizing a standard bearing.
Figure 5 is a front view of a variable pitch fan into which the bearing may be utilized.

As shown in Figure 1, the bearing which constitutes the subject matter of the invention is shown in connection with a variable pitch fan 11 which is arranged to rotate within an outer annular housing or duct 10, but it is to be understood that my bearing may be utilized under any condition wherein the lubricant for the bearing is subject to centrifugal force.

The variable pitch fan 11 may be driven by an electric motor 12 which is supported substantially concentric within the outer annular housing 10 by means of stationary vanes 13. The variable pitch fan comprises generally a hub 16 which is arranged to be suitably mounted upon the motor shaft 14. The blades of the fan are mounted upon a rim 15 which is connected to the hub 16 by means of a suitable wall structure 17. The forward edge of the rim 15 is provided with a nose-like cover 18 which may be removably mounted thereon by means of screws 21. The wall structure 17, the rim 15 and the nose-like cover 18 provide an air enclosure or housing to prevent the air within the housing which is set into motion, from entering into the general air stream passing through the outer housing or duct 10. The motor shaft 14 supports and drives the complete assembly which greatly facilitates the mounting of the variable pitch fan within the air flow housing or duct 10.

The rim 15 is provided with a plurality of annularly spaced openings through which a shank 20 on the blade is mounted. The innermost end of the shank 20 is provided with an actuating collar 24 having an actuating element 25 extending therefrom which fits within the slot of an actuating member 26 which is in turn governed by a control shaft 27 to any suitable mechanical connection such, for example, as illustrated by the dash-dot line 28. The control shaft 27 extends out through the forward end of the nose-like cover 18 and is arranged to be externally actuated for varying the pitch of the fan blades. The actuating collar 24 is securely mounted to the innermost end of the shank 20 by means of a nut 29 so that actuation of the actuating member 26 through the actuating element 25 and the actuating collar 24 moves the variable pitch fan blades to any desired position. The actuating collar 24 may be in the form of a tubular member and upon one side thereof has a tab 30 for engaging the nut 29 to keep it from becoming loose.

The bearing which constitutes the subject matter of the present invention comprises an inside race 33, an outside race 34, between which are mounted bearing elements 35. The innermost end of the outside race 34 is provided with a flange 39 which engages a shoulder 40 of the rim 15 to hold the bearing within the opening 19 in opposition to centrifugal force.

In order to prevent a lubricant from escaping from the bearing element 35, a shell 41 is employed to substantially seal the bearing elements 35 between the races 33 and 34. The shell 41 comprises a cover portion 42 and a skirt portion 43. The cover portion 42 has its inner marginal edge mounted between the upper end of the inside race 33 and the shoulder 36 on the shank 20 of the fan blades. The cover portion 42 of the shell 41 makes a seal with the upper end of the inside race 33 and is arranged to rotate with the inside race 33 as the blades are moved by the control shaft 27. The skirt 43 of the shell 41 surrounds the outside race 34 with a clearance therebetween, so that the skirt 43 may have relative movement with the outside race 34 when the fan blade is moved. The innermost end of the skirt 43 is provided with a packing retainer 44 into which is mounted a packing 45 to prevent lubricant from escaping between the skirt 43 and the outside surface of the race 34. The packing retainer 37 is mounted between the inside race 33 and the outside race 34 on the side of the bearing element 35 which is opposite from the cover portion 42 of the shell 41. Within the packing container 37 is a packing 38 to seal the lubricant against escape between the two races in an inward direction.

In Figure 3 is shown a modification of the invention, in that a snap-in ring 46 which fits within an annular groove of the outside race 47 is arranged to engage the shoulder 40 on the rim 15 to hold the bearing within the opening 19 in opposition to centrifugal force. The other parts of the bearing are the same as that described with reference to Figures 1 and 2.

In Figure 4 is shown a bearing having standard inside and outside races 51 and 50, respectively. The inside race 51 is substantially the same as the inside race 33 shown in Figures 1, 2 and 3 of the drawing. The outside race 50 is arranged to be mounted within a cup 49 having a flange 54 on the innermost end thereof for engaging the shoulder 40 on the rim 15. The outermost end of the cup 49 has an inwardly turned edge 52 against which the outermost end of the outside race 50 engages to oppose centrifugal force. The shell in Figure 4 is identified by the reference character 55 and is arranged to have a depressed inner marginal edge 53 which makes a seal engagement with the outermost end of the outside race 50 when the bearing is mounted to the shank 20 of the blade. In other words, the shoulder 36 of the shank engages the depressed inner marginal edge 53 when the nut 29 is turned on tight. The shell 55 prevents lubricant from escaping from the bearing element in the same manner as that described with reference to the shell 41 in Figures 1, 2 and 3.

The use of a bearing as illustrated enables the fan blade to be turned to any desirable pitch while it is being rotated by the motor because of the low friction thereof. The retention of the lubricant within the bearing keeps the friction low and also gives long life to the bearing.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. In a variable pitch fan having a plurality of blades each having a shank rotatably mounted in an opening in a revoluble member, the improvement of a bearing for supporting the shank of a blade in the opening of the revoluble member, said bearing comprising an inside race, an outside race, and bearing elements between the races, said outside race fitting in said opening and having flange means engaging the revoluble member to hold said bearing in said opening in opposition to centrifugal force, means for mounting said inside race to said shank, and a shell enclosing the outer end of the bearing to prevent the escape of lubricant under the action of centrifugal force from said bearing elements between said races, said shell having a cover portion mounted to and rotatable with the inside race and having a skirt portion surrounding the outside race with a clearance therebetween.

2. In a variable pitch fan having a plurality of blades each having a shank rotatably mounted in an opening in a revoluble member, the improvement of a bearing for supporting the shank of a blade in the opening of the revoluble member, said bearing comprising an inside race, an outside race, and bearing elements between the races, said outside race fitting in said opening and having flange means engaging the revoluble member to hold said bearing in said opening in opposition to centrifugal force, means for mounting said inside race to said shank, a shell enclosing the outer end of the bearing to prevent the escape of lubricant under the action of centrifugal force from said bearing elements between said races, said shell having a cover portion mounted to and rotatable with the inside race and having a skirt portion surrounding the outside race with a clearance therebetween, and packing means between the skirt portion and the outside race.

3. In a variable pitch fan having a plurality of blades each having a shank rotatably mounted in an opening in a revoluble member, the improvement of a bearing for supporting the shank of a blade in the opening of the revoluble member, said bearing comprising an inside race, an outside race, and bearing elements between the races, said outside race fitting in said opening and having flange means engaging the revoluble member to hold said bearing in said opening in opposition to centrifugal force, means for mounting said inside race to said shank, a shell enclosing the outer end of the bearing to prevent the escape of lubricant under the action of centrifugal force from said bearing elements between said races, said shell having a cover portion mounted to and rotatable with the inside race and having a skirt portion surrounding the outside race with a clearance therebetween, first packing means between the skirt portion and the outside race, and second packing means between the inside race and the outside race on the side opposite of the bearing elements from said cover portion.

4. In a variable pitch fan having a plurality of blades each having a shank rotatably mounted in an opening in a revoluble member, the improvement of a bearing for supporting the shank of a blade in the opening of the revoluble member, said bearing comprising an inside race, an outside race, and bearing elements between the races, means for mounting said outside race in said opening, means for mounting said inside race to said shank, and a shell enclosing the outer end of the bearing to prevent the escape of lubricant under the action of centrifugal force from said bearing elements between said races, said shell having a cover portion mounted to and rotatable with one of said races and having a skirt portion surrounding the other race with a clearance therebetween.

5. In a variable pitch fan having a plurality of blades each having a shank rotatably mounted in an opening in a revoluble member, the improvement of a bearing for supporting the shank of a blade in the opening of the revoluble member, said bearing comprising an inside race, an outside race, and bearing elements between the races, means for mounting said outside race in said opening, means for mounting said inside race to said shank, and a shell enclosing the outer end of the bearing to prevent the escape of lubricant under the action of centrifugal force from said bearing elements between said races, 6. In a variable pitch fan having a plurality of blades each having a shank rotatably mounted is an opening in a revoluble member, said shank having a shoulder, the improvement of a bearing for supporting the shank of a blade in the opening of the revoluble member, said bearing comprising an inside race, an outside race, and bearing elements between the races, means for mounting said outside race in said opening, means for mounting said inside race to said shank, and a shell enclosing the outer end of the bearing to prevent the escape of lubricant under the action of centrifugal force from said bearing elements between said races, said shell having a cover portion mounted between the outer end of the inside race and said shoulder and making a seal with said inside race and having a skirt portion surrounding the outside race with a clearance therebetween.

CHARLES N. BEBINGER.